US006527154B2

(12) United States Patent
Larsen et al.

(10) Patent No.: US 6,527,154 B2
(45) Date of Patent: Mar. 4, 2003

(54) FLOOR MOUNTED RETENTION SYSTEM

(75) Inventors: Lance E. Larsen, Southfield, MI (US);
Joanne H. Cole, Ann Arbor, MI (US);
Neil J. Bush, Pinckney, MI (US);
Mark A. Caye, Allen Park, MI (US);
Gregary A. Haupt, New Hudson, MI (US); Benjamin R. Judy, Grandville, MI (US); Daniel J. Koester, Ann Arbor, MI (US); David J. Spykerman, Holland, MI (US); Roger A. Whitley, Brighton, MI (US); Detlef Zimmermann, Schwerte (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/799,213

(22) Filed: Mar. 5, 2001

(65) Prior Publication Data

US 2001/0054632 A1 Dec. 27, 2001

Related U.S. Application Data

(62) Division of application No. 09/358,222, filed on Jul. 21, 1999, now abandoned.
(60) Provisional application No. 60/093,552, filed on Jul. 21, 1998.

(51) Int. Cl.⁷ .................................................. B60R 7/00
(52) U.S. Cl. ......................... 224/545; 224/564; 224/571
(58) Field of Search .................. 224/545, 402, 224/403, 405, 564, 571, 542, 547, 225, 539; 296/37.1, 37.5, 37.6, 24.1

(56) References Cited

U.S. PATENT DOCUMENTS 3,912,139 A   10/1975  Bowman
4,027,892 A   6/1977   Parks
4,056,220 A   11/1977  Trimble
4,442,961 A * 4/1984   Bott .............................. 211/20
4,702,401 A   10/1987  Graber et al.
4,842,148 A   6/1989   Bowman
4,852,779 A   8/1989   Berg
5,259,081 A   11/1993  Henderson
5,388,738 A   2/1995   Russell
5,443,190 A * 8/1995   Cucheran et al. ........... 224/564
5,443,239 A   8/1995   Laporte
5,476,200 A   12/1995  Wong
5,495,969 A   3/1996   Cardenas
5,516,020 A * 5/1996   Lawler et al. ............... 224/405
5,611,472 A * 3/1997   Miller ......................... 224/402
5,664,715 A   9/1997   Gogan et al.
5,696,409 A   12/1997  Handman et al.
5,709,521 A   1/1998   Glass et al.
5,730,414 A * 3/1998   Wenger et al. ........... 224/42.32
6,135,529 A   10/2000  De Angelis et al.
6,254,160 B1 * 7/2001  Marriott et al. ................ 126/38

FOREIGN PATENT DOCUMENTS

DE      2905235 A1    8/1980
EP      0 397 333     11/1990
GB      2 328 651 A   3/1999
WO      WO 97/41001   11/1997

* cited by examiner

Primary Examiner—Stephen K. Cronin
Assistant Examiner—Maerena Brevard
(74) Attorney, Agent, or Firm—Foley & Lardner

(57) ABSTRACT

An apparatus for releasably mounting a vehicle accessory to the floor attachments of a motor vehicle having a floor panel and removable seats. The apparatus includes an attachment mechanism adapted to releasably engage the floor attachments of the motor vehicle and a frame coupled to the attachment mechanism The frame is adapted for contacting the floor of the vehicle to steady the device and for mounting the vehicle accessory thereto.

10 Claims, 7 Drawing Sheets

FLOOR MOUNTED RETENTION SYSTEM

This appln. is a Div. of Ser. No. 09/358,222 filed Jul. 21, 1999 abn., which claims benefit of Prov. No. 60/093,552 filed Jul. 21, 1998.

FIELD OF THE INVENTION

The present invention generally relates to a floor mounted retention system for a motor vehicle. More particularly, the present invention pertains to a retention system which is removably secured to the floor of a vehicle having removable seats. The retention system is secured to the floor of the vehicle by utilizing the seat attachment locations provided in the floor of the vehicle.

BACKGROUND OF THE INVENTION

Many motor vehicles, such as sport utility vehicles, mini-vans, and full size vans, provide seats that are removably attached to the floor of the vehicle. Such removable seats typically have a floor mounted retention system that enables the seat to be removed from the vehicle. Because of the removable nature of such seats, an operator of a vehicle may increase the cargo carrying capacity of the vehicle by removal of the seat.

While removal of the seats increases the cargo carrying capacity of the vehicle, it is nevertheless often inconvenient to transport certain items such as bicycles in which there is a preferred orientation for storing the item. For example, it is often desirable to store bicycles in an upright orientation so as to minimize the possibility of damage to the bicycle as well as to items surrounding the bicycle. In addition, storing a bicycle in an upright orientation maximizes the storage space in the area around the bicycle. While there are devices such as exterior racks that are capable of mounting bicycles, skis, and construction materials, these devices subject the cargo to inclement weather and an increased possibility of theft if the vehicle is left unattended.

Accordingly, it is an object of the present invention to provide a floor mounted retention system that may be removably secured to the attachment points that are used to secure a removable passenger seat.

It is another object of the present invention to provide a floor mounted bicycle retention system having rails that may be fixed in position or slidably extended outside of the vehicle passenger compartment while loading and unloading the bicycle.

It is another object of the present invention to provide a storage device removably attached to the floor of the vehicle for transporting construction materials such as tubing and wood planks.

It is yet another object of the present invention to provide an electrified floor mounted retention system for conveniently supplying electrical power to vehicle accessories located in the rearward portion of the passenger compartment.

BRIEF SUMMARY OF THE INVENTION

The present invention relates to a device for releasable mounting a vehicle accessory to the floor attachments of a motor vehicle having a floor panel and removable seats. The device includes an attachment mechanism adapted to releasably engage the floor attachments of the motor vehicle and a frame coupled to the attachment mechanism The frame is adapted for contacting the floor of the vehicle to steady the device and for mounting the vehicle accessory thereto.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is no way intended to limit the invention, or its application, or uses.

Figure 1:
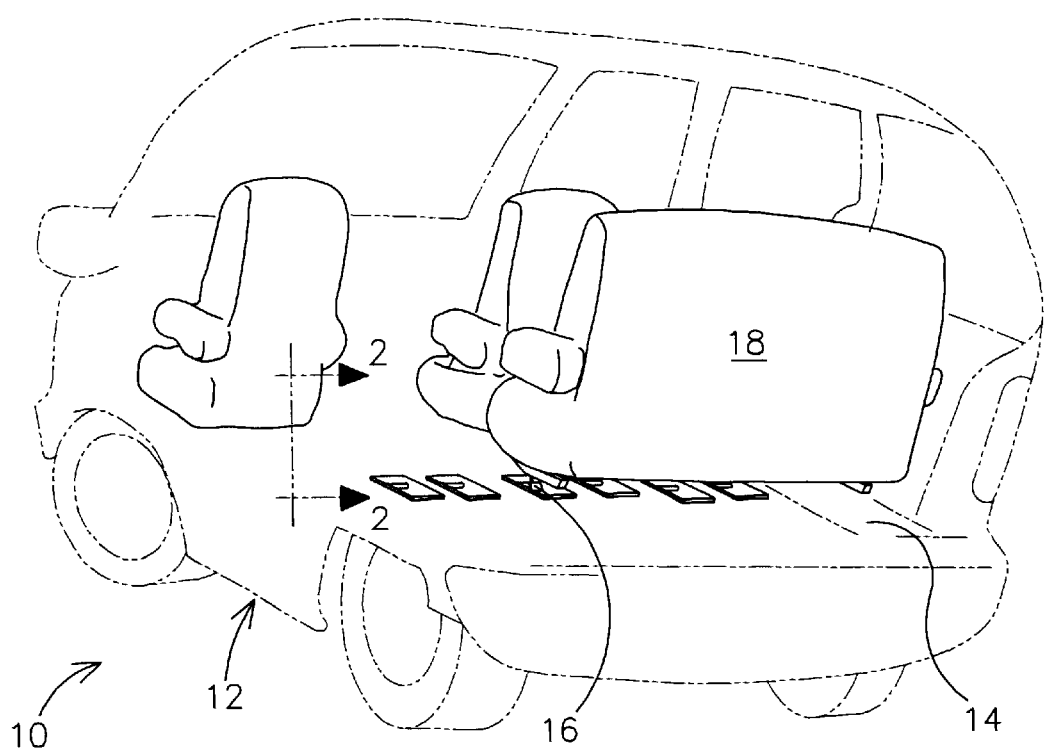
FIG. 1 is a partial exploded perspective view of the interior of a motor vehicle equipped with removable seats constructed in accordance with the teachings of the present invention.

Referring to FIG. 1, a floor mounted retention system constructed in accordance with the teachings of the first preferred embodiment of the present invention is generally identified at reference numeral 10. The floor mounted retention system 10 is shown operatively associated with a vehicle 12 having a floor panel 14. The floor panel 14 includes a series of floor links 16 arranged in rows to provide attachment points for conventional removable seats 18. Depending upon the particular vehicle construction, the floor links 16 are typically provided at the second row seating position, the third row seating position and, if provided, the fourth row seating position within the vehicle 12. One skilled in the art will appreciate that any combination of floor link locations may be utilized within an embodiment of the floor mounted retention system 10 as will be described in detail hereinafter.

Figure 2:
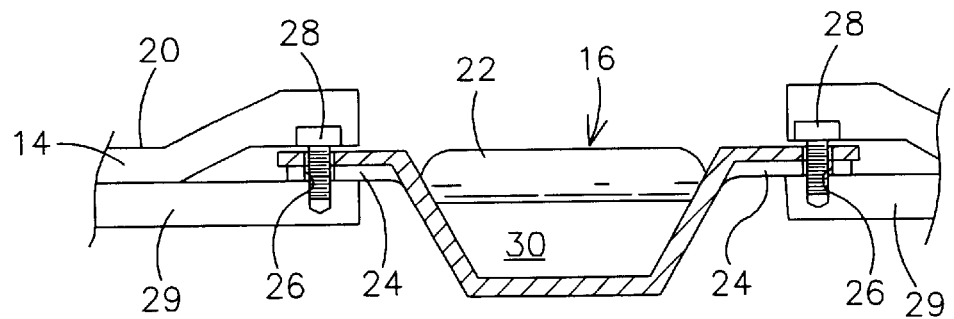
FIG. 2 is a cross-sectional view of an exemplary floor attachment constructed in accordance with the teachings of the present invention.
Figure 3:
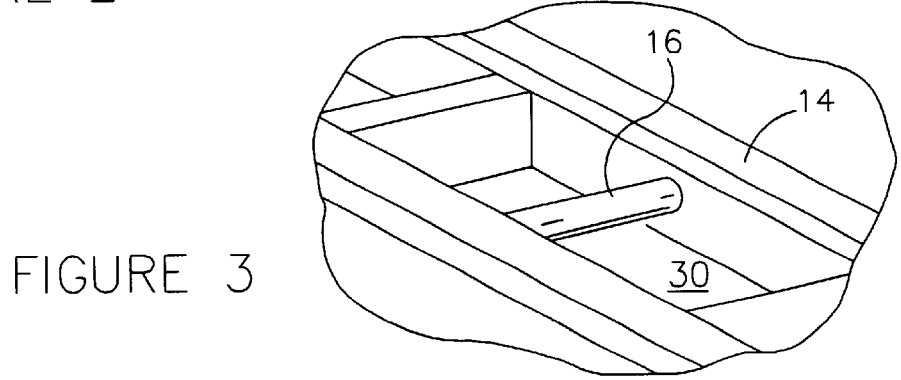
FIG. 3 is a perspective view of the floor attachment of the present invention.

Referring to FIGS. 2 and 3, the floor link 16 is commonly recessed below the interior surface 20 of the floor panel 14 for ease of use of the cargo area once the seats 18 have been removed. The floor link 16 typically includes a cylindrical body 22 having flattened flanges 24 at each end. Each of the flanges 24 includes a fastener aperture 26 for receipt of a fastener 28. The fastener 28 is disposed within the aperture 26 and threadingly engages a vehicle body structural member 29. A recess 30 is defined by the floor panel 14 to provide clearance for the various attachment mechanisms described below.

Figure 4:
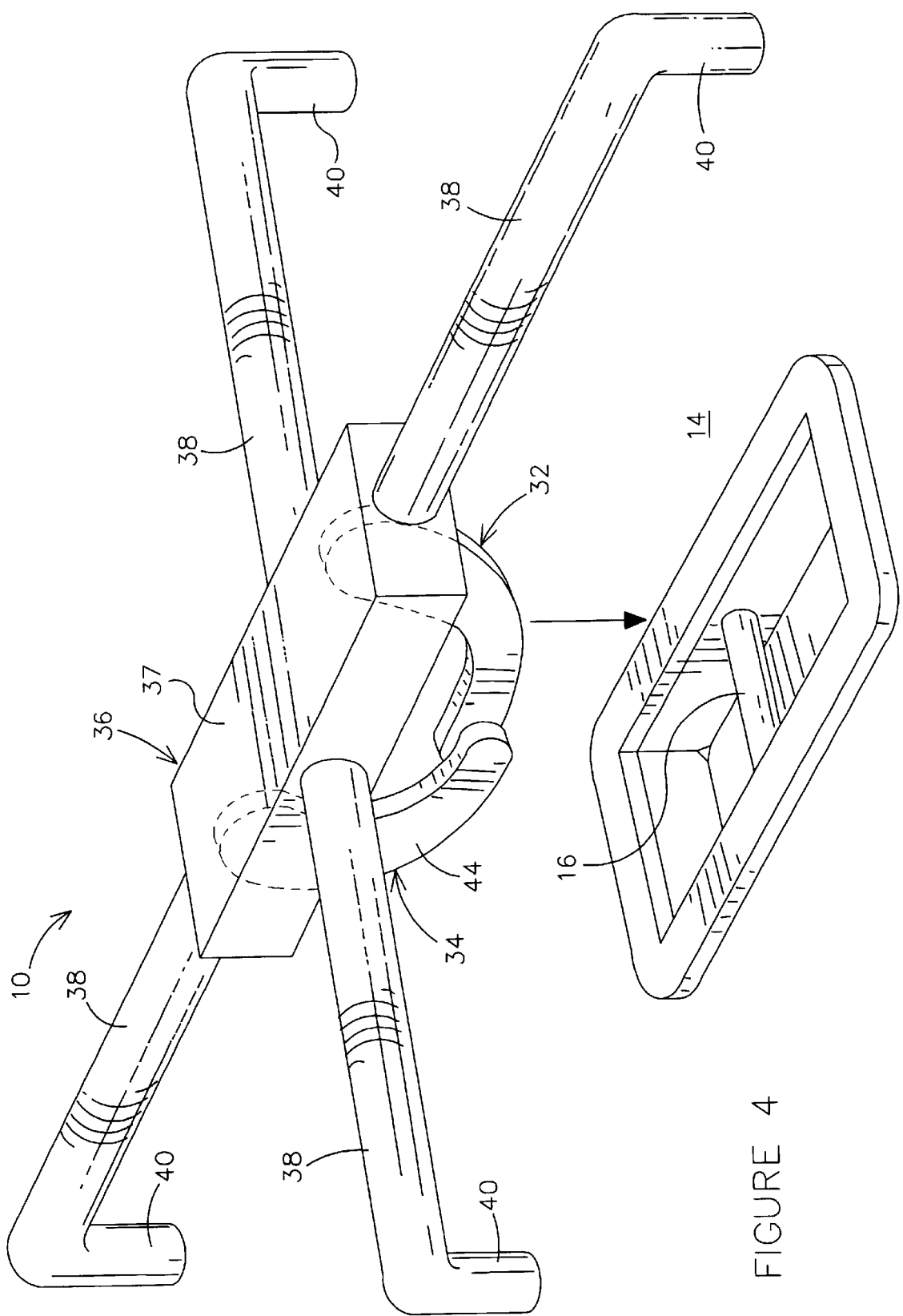
FIG. 4 is a perspective view of a first embodiment of the floor mounted retention system constructed in accordance with the teachings of the present invention.

Referring to FIG. 4, the first embodiment of the floor mounted retention system 10 includes an attachment mechanism 32 having a singular latch 34 for detachably interconnecting a frame 36 to the floor link 16. The frame 36 includes a plate 37 and four arms 38 extending generally parallel to the floor panel 14. In addition, each arm 38 includes a downwardly extending leg 40 to provide stable support for a vehicle accessory (not shown) mounted to the frame 36. One skilled in the art will appreciate that the frame 36 is merely exemplary and that a frame including more or less than four arms is within the scope of the present invention. For example, the frame 36, may include no arms 38 at all. Specifically, a flat plate or a ring placed in contact with the floor panel 14 would provide the requisite support.

Figure 5:
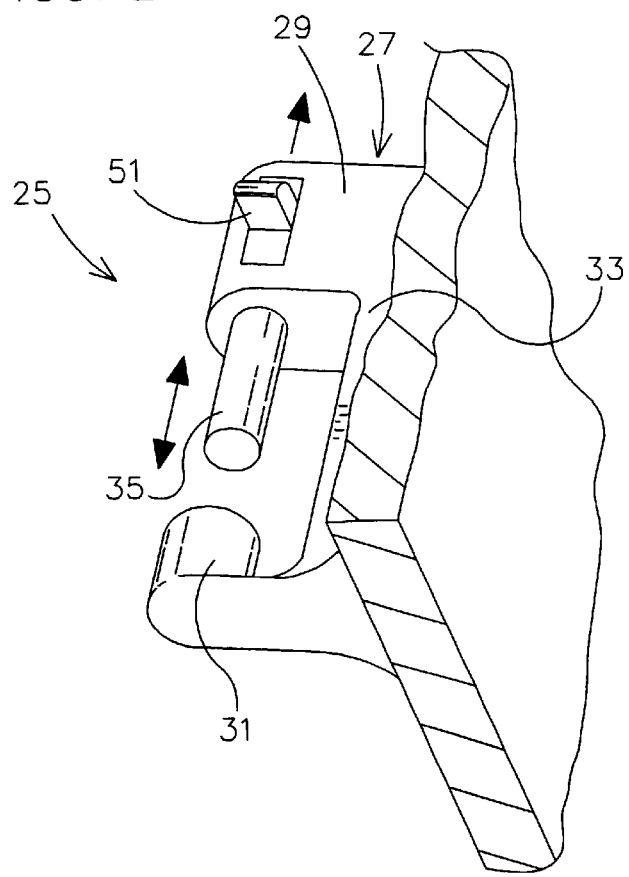
FIG. 5 is a perspective view of a latch mechanism constructed in accordance with the teachings of the present invention.

The latch 34 is depicted as a toggle clamp having a releasable pivotable hook 44 for detachable engagement with the floor link 16. While the releasable pivotable hook 44 is shown in FIG. 4, it is within the scope of the present invention to provide other attachment mechanisms, may be used including a scissors latch, a spring loaded hook, or other device capable of releasably grasping the floor link 16. For example, latch 25 shown in FIG. 5 includes a generally "C" shaped body 27 having a first wall 29 and a second wall 31 interconnected by an end wall 33. The latch 25 also includes a slidable pin 35 operable in a deployed position and a retracted position. The latch 25 also includes a spring means (not shown) for biasing the slidable pin 35 into the deployed position thereby interconnecting the first wall 29 and the second wall 31. The latch 25 further includes a button 51 coupled to the slidable pin 35 whereupon axial movement of the button 51 causes the slidable pin 35 to move from the deployed position to the retracted position. It will be appreciated that other types of attachment mechanisms may be used including a scissors latch, a spring loaded hook, or other device capable of releasably grasping the floor link 16.

Figure 6:
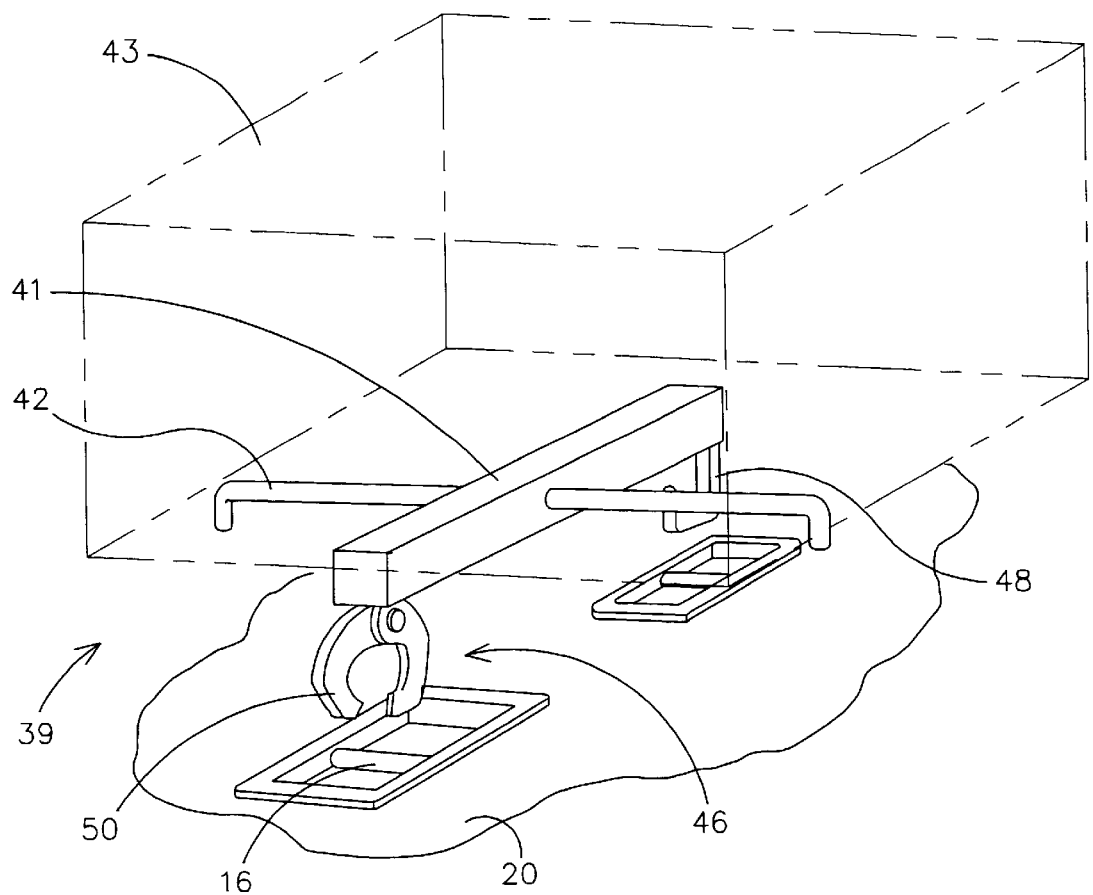
FIG. 6 is a perspective view of a second embodiment of the floor mounted retention system constricted in accordance with the teachings of the present invention.

With specific reference to FIG. 6, a second embodiment of the floor mounted retention system is depicted by the reference numeral 39. The retention system 39 includes an attachment mechanism 46 having a frame 41, a stabilizer bar 42, a fixed hook 48 and a releasable pivotable hook 50. While the releasable pivotable hook 50 is shown on the forward portion of the attachment mechanism 46, it is within the scope of the present invention to provide the fixed hook 48 at the forward edge of the attachment mechanism 46 with the releasable pivotable hook 50 at the rearward edge. In addition, it is within the scope of the present invention to provide another releasable pivotable hook (not shown) in place of the fixed hook 48.

The frame 41 and the stabilizer bar 42 provide support for a vehicle accessory 43. It is contemplated that the vehicle accessory 43 may include a cooler, a cargo storage box, a tool box, a clothes rack, a gun case, or any other cargo retention device. In addition, it should be noted that the attachment mechanism 46 need not include the stabilizer bar 42, but may simply include a plate or ring in contact with the interior surface 20 of the floor panel 14.

Figure 7:
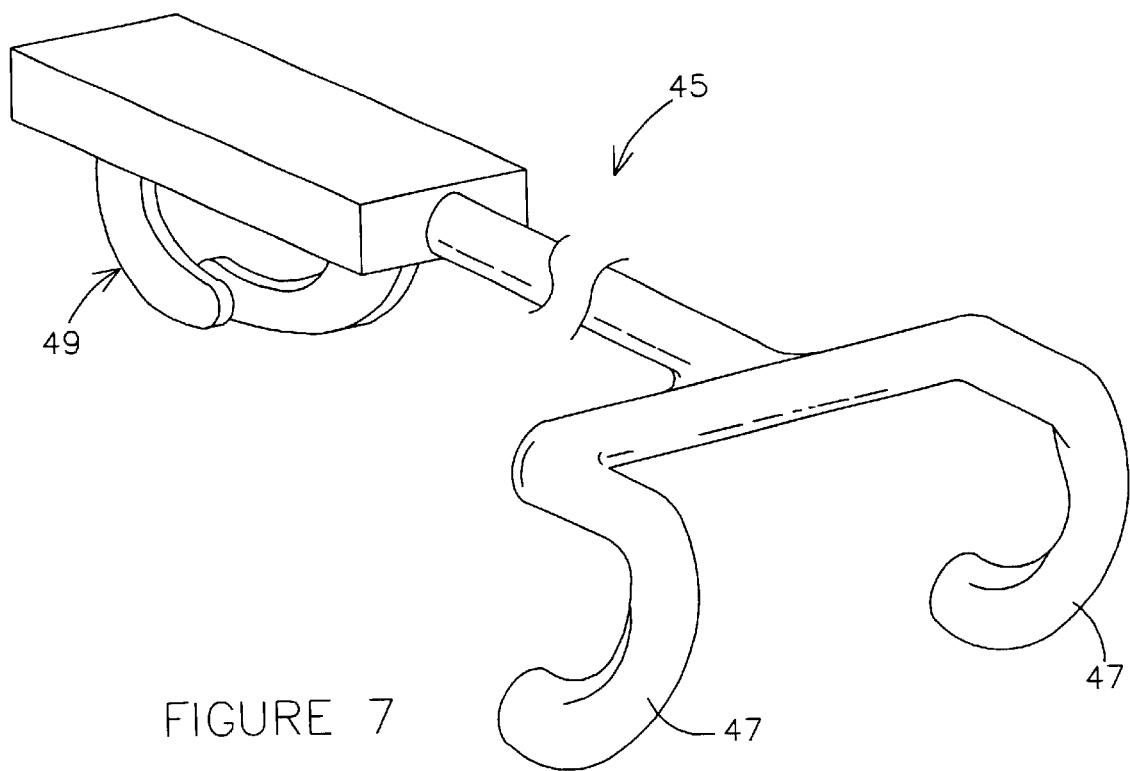
FIG. 7 is a perspective view of a third embodiment of the floor mounted retention system constructed in accordance with the teachings of the present invention.

A third embodiment of the present invention will now be described with reference to FIG. 7. In this regard, the floor mounted retention system 45 according to this embodiment includes a plurality of hooks 47 that may be used to engage a plurality of floor links 16. In addition, the floor mounted retention system 45 further includes a latch 49 that may be releasably secured to one of the floor links 16. Accordingly, when the floor mounted retention system 45 is to be used, the hooks 47 are first placed over the corresponding number of floor links 16 and then the latch 49 is placed over another floor link 16.

Figure 8:
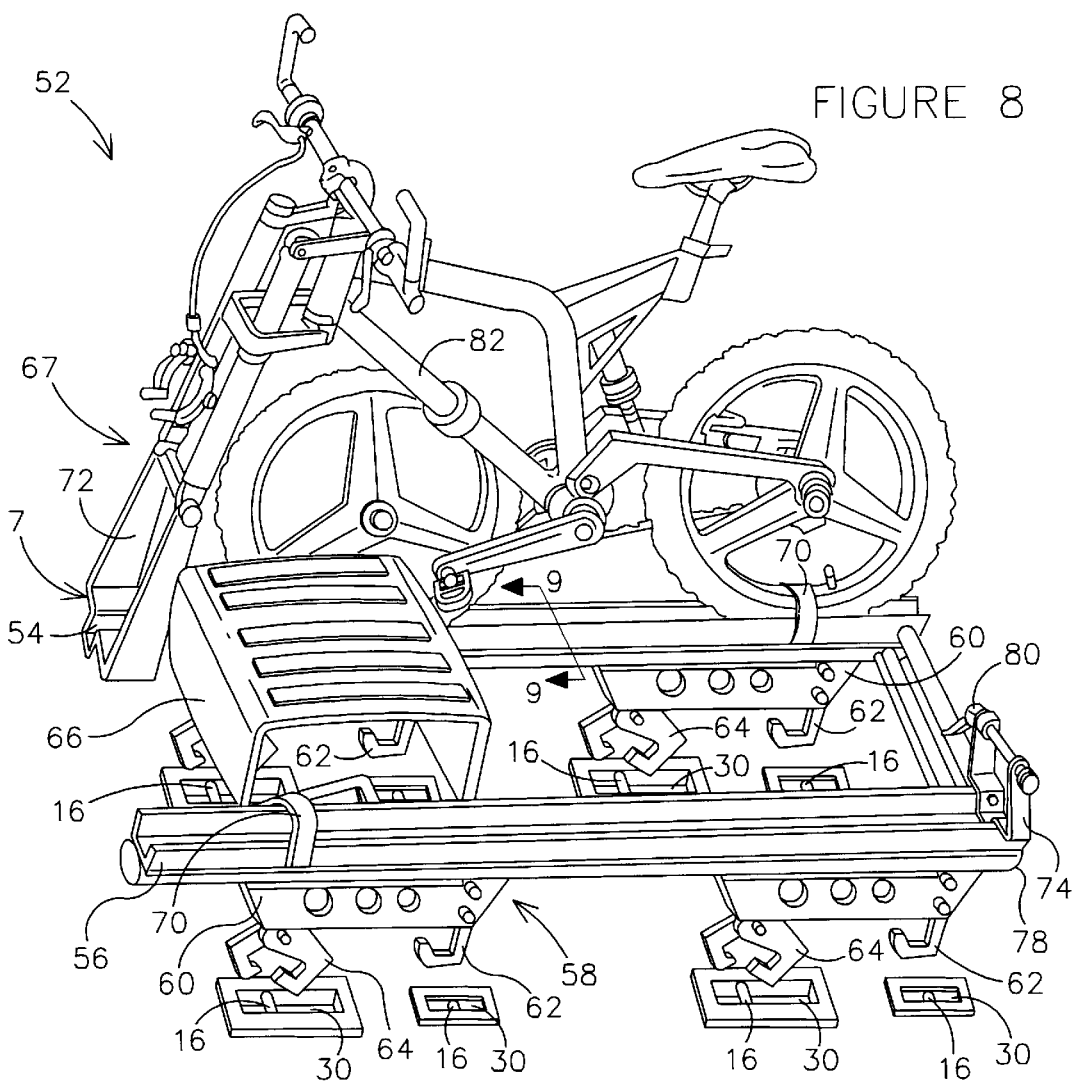
FIG. 8 is a perspective view of a floor mounted bicycle retention system constructed in accordance with the teachings of the present invention.

Referring to FIG. 8, a fourth embodiment of the floor mounted retention system used to secure a bicycle is shown at reference numeral 52. The floor mounted retention system 52 generally includes a plurality of retention rails 54 and 56, an attachment mechanism 58, and a frame 60. The retention rails 54 and 56 may be connected to the frame 60 by a variety of methods including, but not limited to, bolting, welding, bonding, adhesively adhering and snap interconnection. The attachment mechanism 58 includes a plurality of fixed hooks 62 and releasable pivotable hooks 64 coupled to the frame 60 by similar means. The attachment mechanism 58 may be mounted in a plurality of different locations along the length of the frame 60 to allow a full longitudinal adjustment of the frame 60 and the rails 54 and 56 relative to the floor links 16. Accordingly, the floor mounted retention system 52 may accommodate for variance in floor link locations across vehicle product lines. In the preferred embodiment, the floor mounted retention system 52 interconnects eight separate floor links 16 to the frame 60. It is also within the scope of the present invention to provide an attachment mechanism 58 utilizing one or two floor links, which, by way of the frame 60, may support one or more bicycles and retention rails 54 and 56.

Following the removal of the seat 18 from the vehicle 12, the floor mounted retention system 52 is installed by first lowering the fixed hooks 62 into the corresponding recesses 30 and subsequently inserting the releasable pivotable hooks 64 within the corresponding recesses 30. Each of the releasable pivotable hooks 64 is then rotated into an engaged position such that the system 52 is securely held to the floor panel 14. A shroud 66 may be utilized to cover the components of the attachment mechanism 58 thereby increasing aesthetic appeal as well as limiting the possibility of inadvertent release of the system 52 from the vehicle 12. An alternate embodiment of the shroud 66 includes a depression and an integral net (not shown) for storing gear such as a helmet and gloves.

Figure 9:
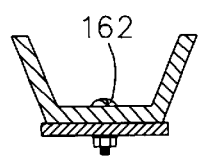
FIG. 9 is a cross-sectional view taken along line 9—9 of FIG. 8.

As shown in FIG. 9, a connector system 67 includes the retention rails 54 and 56. The retention rail 54 has a generally U-shaped upwardly facing channel 68 within which the tires of the bicycle are seated. A set of securing straps 70 may be utilized to prevent the tires of the bicycle from becoming dislodged from the U-shaped channel 68 during vehicle operation. A stanchion 72 is coupled to a forward end 73 of the retention rail 54 to which the front forks of the bicycle may be releasably interconnected. Storage of the bicycle front wheel, which has been removed to provide attachment of the forks to the stanchion 72, may be accomplished by securing the front tire within the U-shaped channel 68 and securing the tire to the frame of the bicycle as shown. A stanchion 74 similar to the stanchion 72 is attached to a rearward end 78 of the retention rail 56. A quick release hub spear 80, commonly known in the art, is shown releasably interconnected to the stanchion 76 for mounting a second bicycle to the floor mounted retention system 52 if necessary. While the embodiment of the floor mounted retention system 52 shown in FIG. 9 requires removal of the front wheel of the bicycle, alternate methods may be utilized which allow both wheels to remain on the bicycle. Such methods would include a linkage that is pivotally mounted to the retention rail 54 or 56 and pivots upward to connect to the down tube 82 of the bicycle. At the end distal to the pivot end of the linkage, the linkage would provide a clamp or strapping means to interconnect the down tube 82 and the rails.

Figure 10:
FIG. 10 is a perspective view of an alternate, extendable retention system constructed in accordance with the teachings of the present invention.
Figure 11:
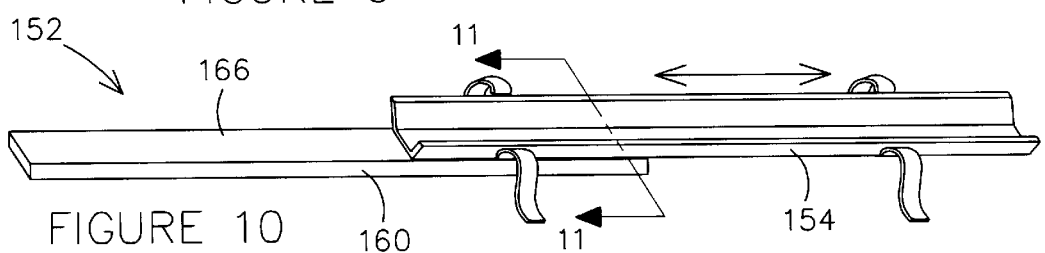
FIG. 11 is a cross-sectional view taken along line 11—11 in FIG. 10.

FIGS. 10 and 11 depict an alternate embodiment of the floor mounted retention system 152. The majority of the components with this embodiment are generally the same as those previously described with reference to FIGS. 8 and 9. For clarity, similar components are labeled with like numerals increased by 100. As shown in FIG. 10, the retention rails 154 and 156 may slide along the length of a frame 160 thereby allowing the rails 154 and 156 to extend past an opening in the vehicle body to provide simplified installation and removal of the bicycles from the vehicle 12. The rails 154 and 156 may be interconnected to move in unison or may be independent to individually slide longitudinally along the frame 160.

Referring to FIG. 11, a fastener 162 is disposed within a mounting aperture formed in the retention rail 154. The fastener 162 is further disposed through a longitudinal slot 166 extending substantially the length of the frame 160. Further, it is within the scope of the present invention to provide a separate multi-piece retention rail assembly having a lower portion that is fixed to the frame 160 and an upper portion which is allowed to traverse fore and aft along the longitudinal axis of the lower piece.

Figure 12:
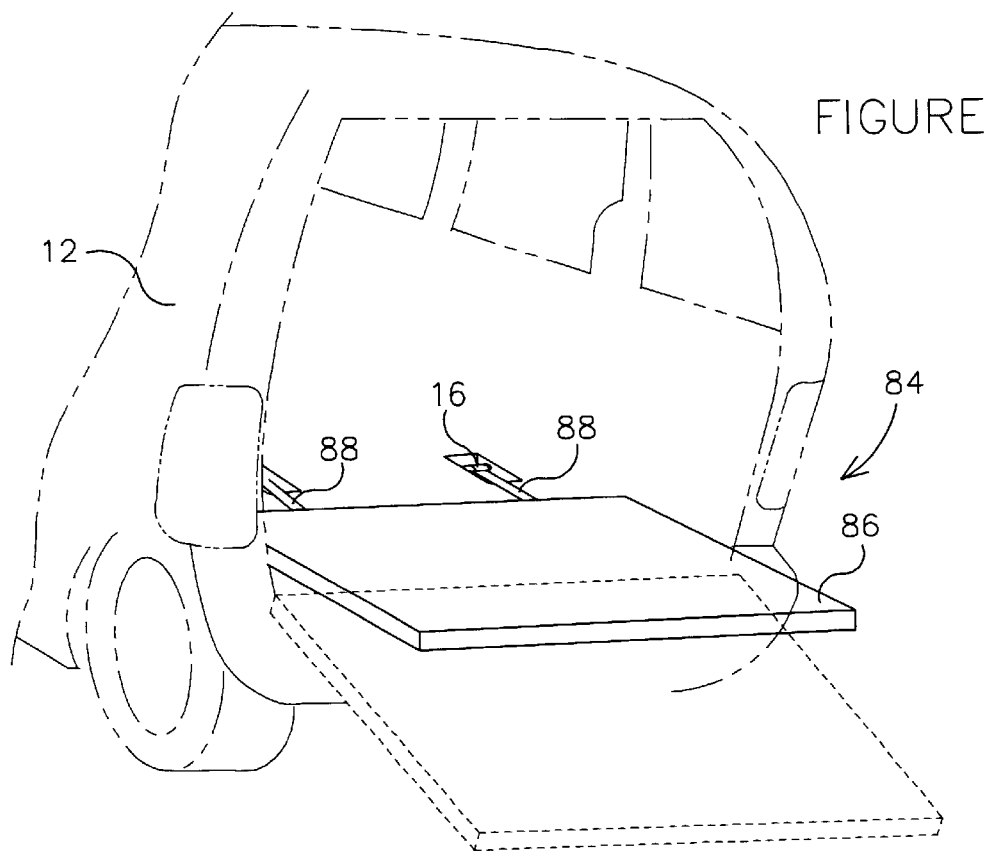
FIG. 12 is a perspective view of a sliding ramp constructed in accordance with the teachings of the present invention.

Referring to FIG. 12, a fifth embodiment of the floor mounted retention system is depicted at numeral 84. The floor mounted retention system 84 includes a generally planar ramp 86 that is interconnected to the vehicle 12 via clamp assemblies 88. One skilled in the art will appreciate that the clamp assemblies 88 may be of the form earlier described as a latch or a hook, or may further include a clip removably interconnected to the floor link 16. The ramp 86 is operable to be moved from a stowed position located within the passenger compartment of the vehicle 12 to an extended position shown in phantom line representation. The ramp 86 is of sufficient length to contact the ground while in the extended position thereby providing assistance to a user when loading and unloading the vehicle 12.

Figure 13:
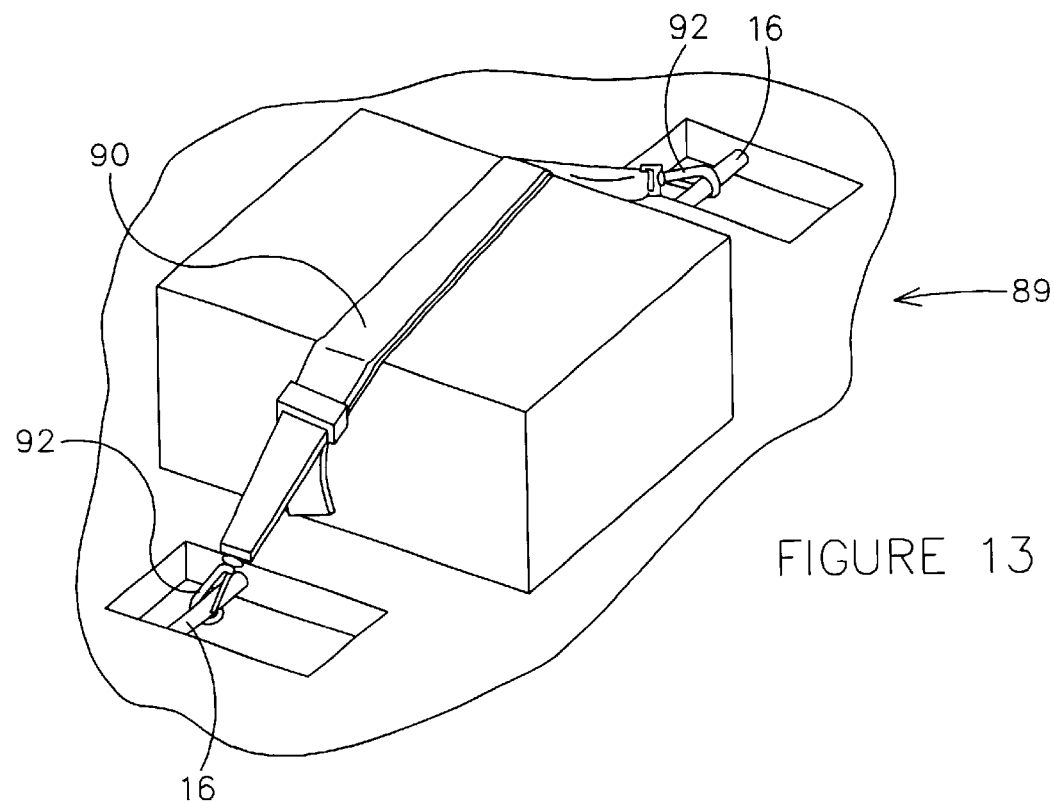
FIG. 13 is a perspective view of a flexible strap coupling arrangement constructed in accordance with the teachings of the present invention.

Yet another embodiment of the floor mounted retention system is shown in FIG. 13 and is depicted at numeral 89. A flexible strap 90 includes a pair of clips 92 attached to each end thereof for removable connection with the floor links 16. The flexible strap 90 may be constructed from an elastic material capable of exerting a force on a variety of cargo or may be adjustable in length to accommodate a variety of cargo shapes and sizes. The embodiment disclosed in FIG. 13 may also include a net (not shown) having a plurality of clips 92 for securing loose articles to the floor links 16.

Figure 14:
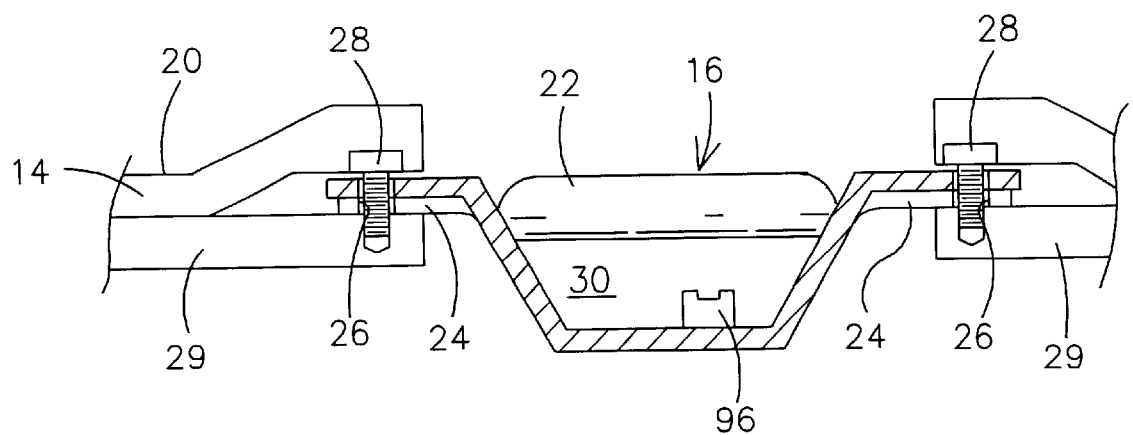
FIG. 14 is a perspective view of an electrified floor attachment constructed in accordance with the teachings of the present invention.

Referring specifically to FIG. 14, an electrification system 94 may be incorporated for use with the floor mounting retention system of the present invention. In general, the electrification system 94 functions by providing remote access to vehicle power through points adjacent to or located at the floor links 16. In the embodiment at FIG. 14, a female power connector 96 is located within the recess 30 adjacent the cylindrical body 22 of the floor link 16. In order to supply power to an electrical appliance such as a radio, a cooler, a child's toy, a television or other entertainment device, a male power connector (not shown) disposed on the floor mounted retention system is engaged with the female connector 96 at the same time the latch or hook is engaged with the floor link 16.

Another embodiment of the electrification system 94 includes supplying positive potential electrical energy to one of the floor links 16 within the floor mounted retention system while a separate floor link or a series of floor links 16 are electrically connected to ground. Accordingly, once a device such as an air compressor (not shown) is coupled to the appropriate pair of positive and negative electrified floor links, a circuit will be complete without requiring any additional cords or connections.

The foregoing discussion discloses and describes merely exemplary embodiments of the present invention. One skilled in the art will readily recognize from such discussion, and from the accompanying drawings and claims that various changes, modifications and variations may be made therein without departing from the spirit and scope of the invention as defined in the following claims.

We claim:

1. A floor mounted bicycle retention system for a motor vehicle having a plurality of floor links, the floor mounted bicycle retention system comprising:

an attachment mechanism having at least one hook member adapted to releasably engage at least one of the floor links of the motor vehicle;

a frame coupled to said attachment mechanism;

a rail coupled to said frame member, said rail adapted to receive the bicycle; and a connector system adapted for detachably interconnecting the bicycle to the rail.

2. The floor mounted bicycle retention system of claim 1, wherein said attachment mechanism includes a fixed hook and a releasably pivotable hook.

3. The floor mounted bicycle retention system of claim 1, further including a shroud for concealing a portion of said attachment mechanism.

4. The floor mounted bicycle retention system of claim 1, wherein said rail is translatable relative to said frame.

5. The floor mounted bicycle retention system of claim 1, wherein a plurality of attachment mechanisms are adapted for detachably coupling the floor links and said frame.

6. The floor mounted bicycle retention system of claim 1, further including a stanchion coupled to said frame, said stanchion adapted for releasably engaging a portion of the bicycle.

7. A bicycle transport device for a vehicle having at least one floor attachment interface, comprising:

a frame member having at least one generally horizontal portion adapted to secure a first portion of the bicycle and at least one upwardly extending support member adapted to secure a second portion of the bicycle;

the frame member having a mechanism including at least one hook member configured to operably engage the floor attachment interface to releasably secure the frame member to the vehicle; and a connector system adapted to detachably interconnect the bicycle to the frame member.

8. The bicycle transport device of claim 7, wherein the generally horizontal portion is a U-shaped channel and the first portion of the bicycle is a wheel.

9. The bicycle transport device of claim 7, wherein the mechanism includes a fixed hook and a releasably pivotable hook.

10. The bicycle transport device of claim 7, wherein the floor attachment interface is at least one floor link.

\* \* \* \* \*